Oct. 30, 1962  H. HORLACHER  3,060,690
CONTROL MECHANISM FOR MACHINE TOOL TABLE FEED
Filed Nov. 23, 1960  6 Sheets-Sheet 1

Fig.1

INVENTOR.
HERMAN HORLACHER
BY
Howard Keiser
& John F. Verhoeven
ATTORNEYS

INVENTOR.
HERMAN HORLACHER
BY
ATTORNEYS

United States Patent Office 3,060,690
Patented Oct. 30, 1962

3,060,690
CONTROL MECHANISM FOR MACHINE TOOL
TABLE FEED
Herman Horlacher, Cincinnati, Ohio, assignor to The
Cincinnati Milling Machine Co., Cincinnati, Ohio, a
corporation of Ohio
Filed Nov. 23, 1960, Ser. No. 71,207
10 Claims. (Cl. 60—53)

This invention relates to a machine tool feed control mechanism and is particularly adapted for use in a bed type milling machine.

In bed type milling machines, a rotary fluid motor is often used to power the table feed movement. One method of controlling the feed speed and direction of travel of the table is to control the rate and direction of movement of fluid supplied to the motor from a reversible, variable displacement pump. For high production, automatic cycle applications, a milling machine must perform uniformly from one cycle to the next. Therefore, the pump operation must be uniform from one cycle to the next. This requires a pump control mechanism which is capable of repeating its operation accurately for each machine cycle. Furthermore, in high production machines, cycle time is important. Consequently, the mechanism must be quickly responsive to signals which call for changes in feed rate and direction of table travel. The mechanism should also be compact to conserve space and material. The mechanism should also be readily adapted for remote control operation since bed type milling machines are often very large and not adapted for control from a station conveniently placed near the pump control mechanism.

It is an object of this invention to provide a pump control mechanism that gives accurate and repeatable pump control.

It is another object of this invention to provide a pump control mechanism that is quickly responsive to demands for changes in pump displacement.

Still another object is to provide a compact unit which is readily adapted for remote control operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

A mechanism constructed in accordance with the preferred form of this invention has a control lever connected to a pump for control of the pump in accordance with movement of the control lever. The control lever is reversibly movable from a neutral position by operation of a first pair of hydraulically actuated plungers. The direction of movement of the control lever from the neutral position determines the direction of flow of fluid from the pump. Two adjustable cams are spaced from the neutral position of the control lever. When the control lever is moved from the neutral position, it engages the surface of one of the cams and is held solidly in contact with that cam. The distance to the cam from the neutral position of the control lever determines the amount of movement of the control lever and hence the displacement of the pump. To adjust each of the cams for regulating control lever movement from the neutral position, a second pair of plungers is provided. Each of the second pair of plungers is movable between alternate positions determined by stop members against one of which the plunger is firmly held when a selected cam adjustment is made. Thus by solidly holding the control lever against a cam which is positioned by a plunger that is firmly held in a selected and rigidly established position, positive control for a selected pump displacement is achieved which may be repeated accurately.

In an alternate embodiment, servo controlled motors replace the second pair of plungers and are connected to the cams to provide the means by which adjustment of the cam positions is made. By using the servo controlled motors, the cams may be remotely adjusted to any angular position between limiting extremes.

A clear understanding of the construction and operation of this invention can be obtained from the following detailed description and the attached drawings wherein.

Figure 1:
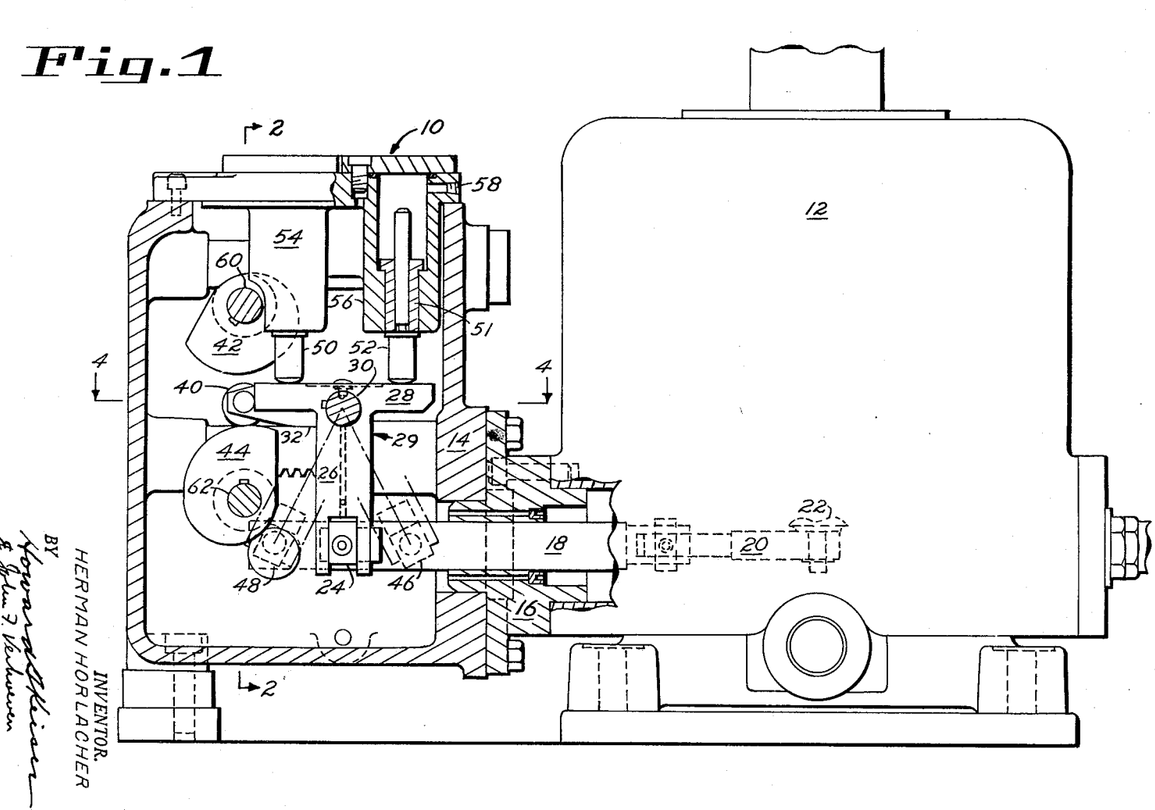
FIG. 1 is a sectional view of a pump control mechanism showing its position relative to the pump.

FIG. 1 shows the control mechanism 10 as it is related to a variable delivery pump 12. The housing 14 of the mechanism 10 is joined to the pump 12 by a coupling member 16 which is bolted both to the housing and the pump. An axially movable control bar 18 extends from the mechanism in the housing 14 through the coupling member 16 into the pump 12. The end of the control bar 18 received in the pump 12 is connected with a pump member 20 which in turn is connected with a pendulum portion 22 of the pump, the position of which determines the volume and direction of flow of fluid from the pump. As the control bar 18 is moved, the pump member 20 and pendulum portion 22 are moved to produce a pump displacement corresponding to the direction and amount of movement from a neutral position at which the pump displacement is at a minimum or no volume of flow condition.

Figure 4:
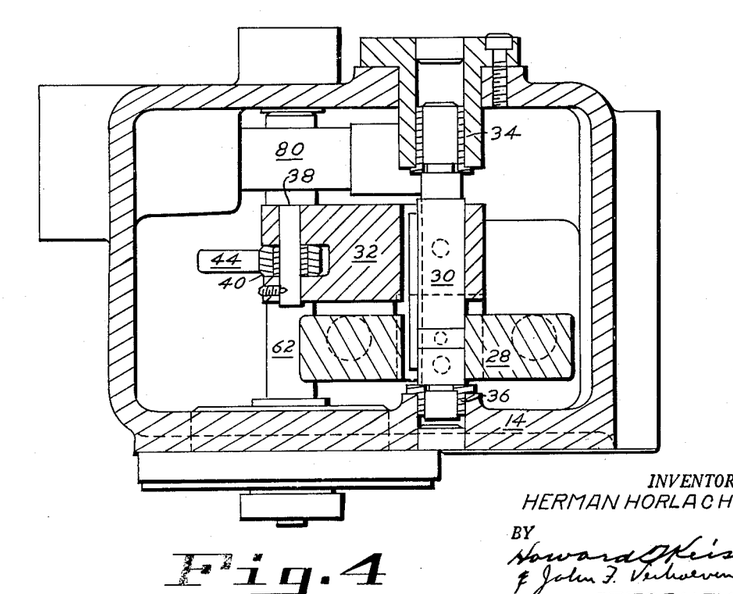
FIG. 4 is a sectional view of FIG. 1 on line 4—4.

The other end of the control bar 18 which extends into the housing 14 is connected to the mechanism which controls the operation of the pump 12. The control bar 18 is pivotally connected to a linking member 24 which is slidably received in an arm 26 of the control lever 29. The control lever 29 includes the arm 26, a cross portion 28, a stop arm 32 (FIG. 4), and a shaft 30, all of which are fixed together to move as one member. The ends of the shaft 30 of the control lever 29 are journaled in bushings 34, 36 which are received in the housing 14. Thus the control lever 29 is pivotally received in the housing 14 and connected to the control bar 18 for axial movement thereof.

A roller 40 is received in the stop arm 32 (FIG. 4) of the control lever 29 and is adapted to engage one of a pair of rotatably positionable spiral stop cams 42, 44 (FIG. 1) when a pivotal force is applied to the control lever 29. Depending on the adjustment of the cams 42, 44 and the direction of the pivotal force, the control lever 29 might be moved to either of the positions 46, 48 indicated, for example, to cause an axial movement of the control bar 18 resulting in a particular displacement in the pump 12 and direction of fluid flow from the pump. To pivot the control lever from the neutral position and into engagement with one of the cams 42, 44, each plunger of a pair of plungers 50, 52 is slidably received in a cylinder 54, 56 respectively, in the housing 14. The plungers 50, 52 are engaged with the cross portion 28 of the control lever 29. Each of the cylinders 54, 56 has a port 58 connected with a fluid line (not shown in FIG. 1) which is alternately and selectively connectable with a source of fluid under pressure and a drain line. As shown, the plunger 52 is slidably received through a bushing 51 which is slidably received in the cylinder 56. The reception of the plunger 50 in cylinder 54 is the same as that for plunger 52 in cylinder 56. The bushing 51 assumes the seated position shown in FIG. 1, and the plunger 52 moves downward from the retracted position shown relative to the bushing 51 when the cylinder 56 is connected to pressure and cylinder 54 is connected to drain. When, thereafter, the pressure is applied to cylinder 54 and cylinder 56 is connected to drain, the plunger 52 of cylinder 56 moves up to the bushing 51 thereof, and the bushing 51 and plunger 52 move upward into the cylinder 56. At this time the bushing 51 of cylinder 54 is seated in its lowermost position in the cylinder and the plunger is extended downwardly therefrom. If pressure is introduced to cylinder 56 and maintained in cylinder 54, the bushing and plunger of cylinder 56 (resisted only by the hydraulic force exerted on the plunger 50 of cylinder 54) move downwardly to the position shown in FIG. 1, and the plunger 50 is consequently moved up to the bushing of cylinder 54 so that the plunger and bushing of that cylinder are in the same positions as the plunger and bushing of cylinder 56. Thus, the control lever is held rigidly in the center position since both plungers 50, 52 which are engaged with cross portion 28, are in the same relative positions and exert a balanced force thereon. This center position defines the neutral position of the control lever 29. If cylinder 54 is connected to the source of pressure and cylinder 56 is connected to a drain line, an unbalance of forces would result in pivotal movement of the control lever toward the position 46. If the cylinder conditions are reversed, the unbalance of forces causes pivotal movement of the control lever 29 toward position 48.

With a pivotal movement of the control lever 29 from its neutral position, the pivotal adjustment of the spiral cams 42, 44 determines the amount of movement allowed since the roller 40 moves toward and engages one of these cams when the control lever 29 is pivotally moved. Each of the cams 42, 44 is fixed to a rotatable cam shaft 60, 62 respectively. As these cam shafts 60, 62 are rotated, the spiral surfaces of the cams 42, 44 vary relative to the neutral position of the control lever 29. The control lever 29 cannot pivot beyond the point at which the roller 40 engages the spiral surface of one of the cams 42, 44. The angular position of the cams 42, 44 then determines the amount of pivotal movement of the control lever 29 from its neutral position when there is an unbalanced force produced thereon by the plungers 50, 52.

Figure 2:
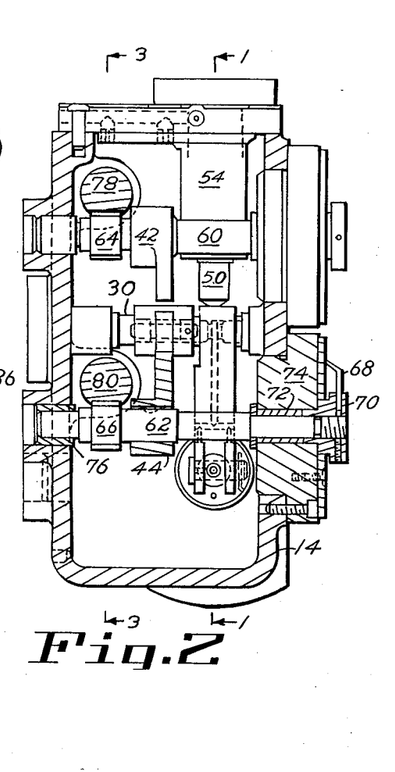
FIG. 2 is a sectional view of the control mechanism of FIG. 1 on line 2—2.
Figure 5:
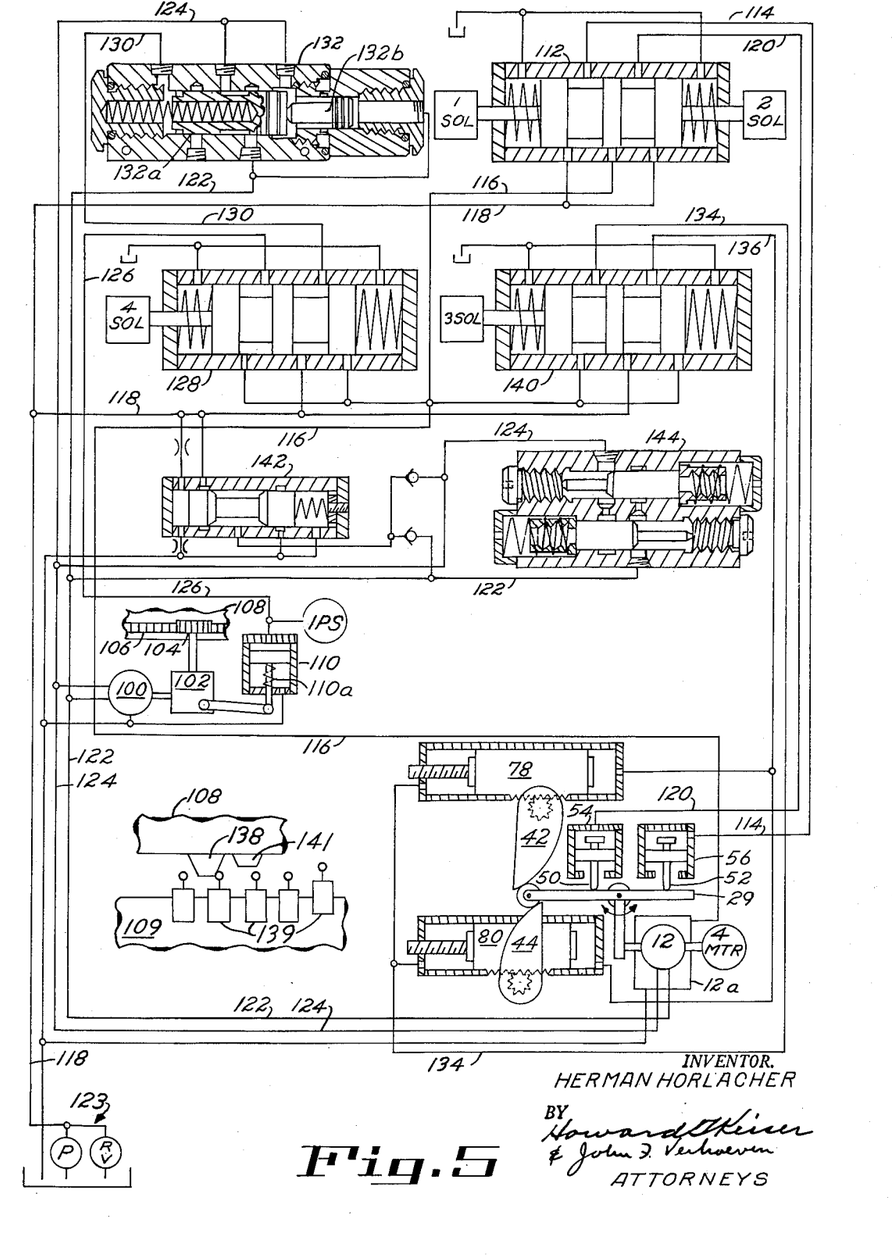
FIG. 5 is a hydraulic circuit including a schematic representation of the control mechanism of FIG. 1.

Each of the cam shafts 60, 62 is rotatable to adjust the spiral surfaces of the cams 42, 44 relative to the neutral position of control lever 29 to control the amount of movement of the control lever 29 when the plungers 50, 52 and cylinders 54, 56 create an unbalanced pivotal force thereon. As shown in FIG. 2, the shaft 62 is journaled at one end through a bushing 72 which is received in a dial portion 74 of the housing 14. The other end of the shaft 62 is journaled in a bushing 76 received in the opposite side of the housing 14. Shaft 62 has a cap 70 fixed on the end received through the bushing 72 from which a pointer 68 extends. The dial portion 74 is calibrated in units relating the angular position of the shaft 62 with a feed speed of a machine slide 108 (FIG. 5). For each angular position of the shaft 62 and cam 44 (FIG. 1) there is an allowable movement of the control lever 29 to a predetermined position toward the position 46 which will produce a predetermined feed speed as indicated by the pointer 68 (FIG. 2) and dial portion 74. The shaft 60 is received in the housing 14 in a like manner as shaf 62 is received. Each angular position of the shaft 60 and cam 42 (FIG. 1) will allow a predetermined amount of movement of the control lever 29 toward the position 48 to move the control bar 18 to effect a pump displacement which will produce a corresponding feed speed of the slide 108 (FIG. 5).

Figure 3:
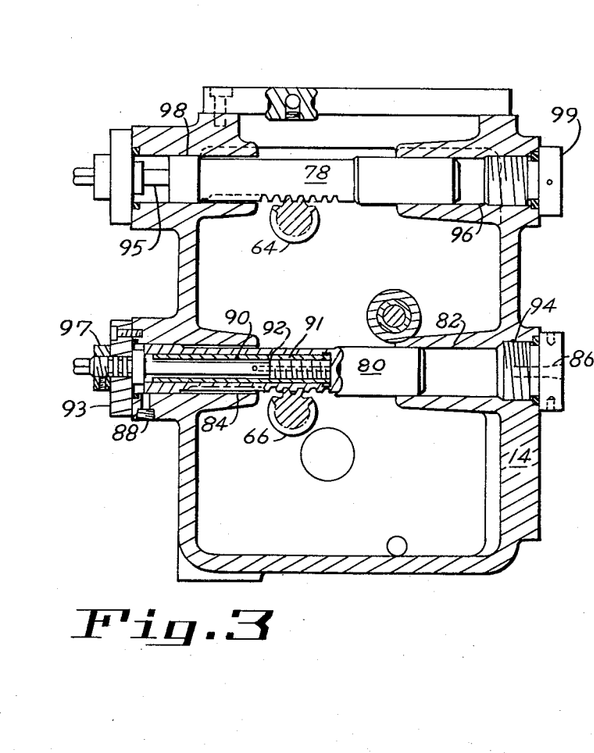
FIG. 3 is a sectional view of FIG. 2 on line 3—3.

Angular adjustment of the cams 42, 44 (FIG. 1) is made by selected rotation of the cam shafts 60, 62 to which the cams are fixed. Each of the shafts 60, 62 has a pinion 64, 66 (FIGS. 2, 3) respectively, fixed thereon. Each of the pinions 64, 66 is engaged by a rack plunger 78, 80 respectively, which is slidably received in housing 14. The rack plunger 80 is slidably received between cylinder bores 82, 84 (FIG. 3) in opposite walls of the housing 14. The bores 82, 84 have a fluid port 86, 88 respectively, in communication with a fluid line (not shown in FIG. 3) which may be alternately connected to a source of pressure and to drain. The rack plungers 78, 80 together with the respective bores thereof comprise a pair of fixed stroke motors for adjustment of the cams 42, 44. As shown, the rack plunger 80 is in the left position, a condition in which bore 82 is connected to the source of fluid under pressure and bore 84 is connected to the drain. The left position of the rack plunger 80 is determined by the relative position of a stop rod 92 relative to a sleeve nut 91 in which the rod is threadedly received. The sleeve nut 91 slides longitudinally in the bore 84 but does not rotate. The sleeve 91 is adapted to engage the bottom of a bore 90 in the rack plunger 80. If the stop rod 92 is turned in one direction the sleeve nut 91 will be extended from the stop rod and the rack plunger 80 will not move as far to the left. If the stop rod is turned in the opposite direction, the sleeve will not extend from the stop rod 92 as far and the rack plunger 80 will move farther to the left. (As shown in FIG. 3, the sleeve nut is adjusted to allow maximum movement to the left.) The stop rod 92 extends through a cap 93 on the bore 84 and is held in place by a locating nut 97. The nut 97 turns with the stop rod 92. By adjustment of the stop rod 92 the left position may be adjusted with a corresponding change in the angular position of the cam 44 (FIG. 1). With bore 84 (FIG. 3) connected to drain, the rack plunger 80 would move to the right until it engages the plug 94 in bore 82 which acts both as the end of the bore and as a fixed stop therein. In the right position, the rack plunger 80 would adjust the cam 44 (FIG. 1) to allow a maximum movement of the control lever 29 to produce a rapid traverse movement of the slide 108 (FIG. 5). The rack plunger 78 is slidably received in bores 96, 98 and is movable in the same manner as the rack plunger 80. The rack plunger 78 controls the rotation of shaft 60 for angular positioning of the cam 42 (FIG. 1).

By the mechanism described, forces produced by the plungers 50, 52 determine the direction of feed by determining the direction that the control lever 29 is swung to move the control bar 18 and pump control member 20. The positions of the cams 42, 44 establish the displacement of the pump 12 and hence the volume of fluid circulated therethrough. The direction and volume of fluid flow determines the direction and rate of rotation of the rotary fluid motor 100 (FIG. 5) which moves the machine slide or table 108. The rate of rotation of the fluid motor may be alternated between two speeds for each direction of rotation thereof since each cam may be adjusted to one or the other of two predetermined positions. By using the spiral form of cams 42, 44, a wide range of adjustment can be obtained with a minimum requirement for space and movement.

In FIG. 5, the hydraulic feed motor 100, which is energized by the variable displacement pump 12, is shown connected to a gear reduction box 102 which drives a pinion 104 engaged with a rack 106 fixed to the machine table 108. The machine table 108 is slidably received on ways (not shown) in the machine base 109 for reciprocal movement relative to a machine spindle (not shown). A brake cylinder and piston 110 is connected to the gear reduction box 102 to prevent table movement when the brake is set by the spring 110a.

To start a machine cycle of operation, a feed left solenoid 1SOL is energized and shifts the plunger of a valve 112 to the left. Fluid lines 120 and 116 are then connected through the valve 112. Line 120 is connected to the cylinder 54 (see also FIG. 1) and line 116 is a drain line connecting to the sump 12a of the pump 12. At the same time fluid lines 114 and 118 are connected in valve 112. Line 118 connects directly to a source of pressure 123 while line 114 connects with the cylinder 56 (see also FIG. 1). The plunger 50 moves up and plunger 52 moves down as the unbalance of force on the control lever 29 pivots that lever clockwise. The control bar 18 (FIG. 1) moves left to produce a displacement in the pump 12 which causes fluid under pressure to move from the pump 12 (FIG. 5) through fluid line 124. Fluid line 122 from the motor 100 then is a return line to the pump 12. The fluid motor 100 begins to run and move the table 108 to the left.

At the same time that the solenoid 1SOL is initially energized, a brake solenoid 4SOL is also energized to shift the plunger of a valve 128 to the left to connect fluid line 118, the main pressure line, and line 126. Fluid under pressure is applied to the brake cylinder and piston 110 to compress spring 110a and release the braking force in the reduction box 102 to allow the table to be moved.

At the same time, the shifting of the plunger of valve 128 disconnects line 130 from pressure line 118. Line 130 connects to an anti-creep valve 132 at the left end of the plunger 132a therein. Line 124 from the pump 12 is a pressure line now while line 122 from the pump 12 is a return line. The pressure in line 124 at the right end of the plunger 132a of valve 132 causes that plunger to shift to the left. In shifting to the left, lines 122 and 124 are isolated from one another in the valve 132 which sends the fluid through the motor 100 which is in a parallel fluid circuit with valve 132 across fluid lines 122 and 124.

At the start of the table cycle another solenoid 3SOL is also energized to shift the plunger of a valve 140 to the left. Fluid lines 134 and 118 and 136 and 116 are connected in valve 140. Line 134 connects to the left end of the rack plungers 78, 80 (bores 84, 98 FIG. 3) while line 136 connects to the right end of the rack plungers (bores 82, 96 FIG. 3). Since line 118 is a pressure line and line 116 is a return drain line to the pressurized fluid source 123, the rack plungers are shifted to the right until they are stopped by the plugs 86, 99 (FIG. 3) in the bores 82, 96 respectively. The cams 42, 44 are pivoted clockwise to a rapid traverse angular position which is remote from the neutral position and allows maximum pivotal movement of the control lever 29. The table 108 then moves to the left at a rapid traverse rate.

After a predetermined table movement a table dog 138 fixed to the table 108 operates one of a series of limit switches 139 fixed to the machine base 109 (including limit switches 1LS, 2LS, 3LS, 4LS, and 5LS) and solenoid 3SOL is deenergized. The valve 140 now connects line 118 to line 136 and line 116 to line 134 and the rack plungers shift to the left to engage the stop members 92, 95. The cams 42, 44 are pivoted counterclockwise to predetermined positions which allow predetermined movements of the control lever 29 one way or the other from its neutral position. These movements respectively produce pump displacements which give predetermined table rates of movement corresponding to the predetermined angular positions of the cams 42, 44. Since the cylinders 56, 54 are still connected to pressure and drain respectively, the position of the plunger 78 and resulting angular adjustment of the cam 42 determines the position which the control lever assumes at this time, the position now being near to the neutral position. This effects a reduction in speed from rapid traverse to a predetermined feed rate.

After a predetermined amount of feed movement of the table 108, the table dog 138 operates another limit switch of the series 139 to energize solenoid 3SOL again which effects a shift of the rack plungers 78, 80 to their rapid traverse or remote positions. After a short rapid traverse movement, the table dog 138 operates another limit switch of the series 139 to deenergize solenoid 1SOL and energizes solenoid 2SOL. The plunger of valve 112 shifts to the right and connects fluid line 120 to line 118 and line 114 to line 116. The pressure differential in cylinders 54 and 56 is reversed causing an unbalance of force on control lever 29 which swings it counterclockwise. The rapid traverse solenoid 3SOL remains energized and the cam 44 is angularly positioned to allow for maximum movement of the control lever from the neutral position in the counterclockwise direction.

When the control lever swings counterclockwise, the line 122 becomes a pressure line and line 124 becomes a return line. Line 122 connects to the right end of a second plunger 132b in valve 132. Plunger 132b is forced to the left since line 124 which is in communication with the left end of plunger 132b is now a return line. Plunger 132b engages plunger 132a and holds it in the left position to prevent connection of lines 122 and 124 in valve 132.

Due to the energization of solenoid 3SOL, the motor 100 runs at a rapid traverse rate to return the table 108 to the right toward its initial position. When the table 108 arrives at its initial position, a table dog 141 operates a limit switch of the series 139 to deenergize all of the solenoids. The plunger of valve 112 shifts to connect pressure line 118 to both lines 114 and 120. Pressure is then applied to both cylinders 54, 56 and plungers 50, 52 exert a balanced force on control lever 29 which is moved to its neutral position. In valve 140, line 118 is connected to line 136 and line 116 is connected to line 134 and the rack plungers 78, 80 are shifted to their left positions. When solenoids 4SOL is deenergized and the plunger of valve 128 shifts to the position shown, the line 126 connecting to the brake piston and cylinder 110 is connected to drain line 116 and the spring 110a sets the brake in reduction box 102. Also in valve 128, line 130 is connected to pressure line 18. The pressure in line 130 shifts the plunger 132a of valve 132 to the right and lines 122 and 124 are shorted together to prevent any pressure differential in those lines from causing the fluid motor 100 to tend to rotate. This then is an anticreep action which, with the brake piston and cylinder 110 prevents the table 108 from moving except during cycle operation.

The hydraulic circuit also contains a pressure reducing valve 142 which applies reduced pressure fluid to both fluid lines 122 and 124 during the period of time between cycles when the displacement of the pump 12 is at a null condition and when pressure in either of lines 122 or 124 drops below the reduced pressure level. This keeps both lines 122 and 124 full of fluid so that at the start of a cycle, the table will not jump due to an air filled line condition.

Also included in the hydraulic circuit is an overload protection valve 144 which has a section connected to each of lines 122 and 124. Each section of valve 144 is adjusted to allow excessive pressure build up in the lines 122 and 124 to be relieved in order to prevent damage to the hydraulic circuit. Pressure might build up to an unsafe level if the table 108 met an obstruction during travel which would cause the fluid motor 100 to be stopped while the pump 12 continued to supply fluid under pressure thereto. One or the other of the plungers in the valve 144 shifts against a spring force to connect lines 122 and 124 to short pressure from the pump 12 to the return side thereof when there is excessive pressure build up.

Figure 6A:
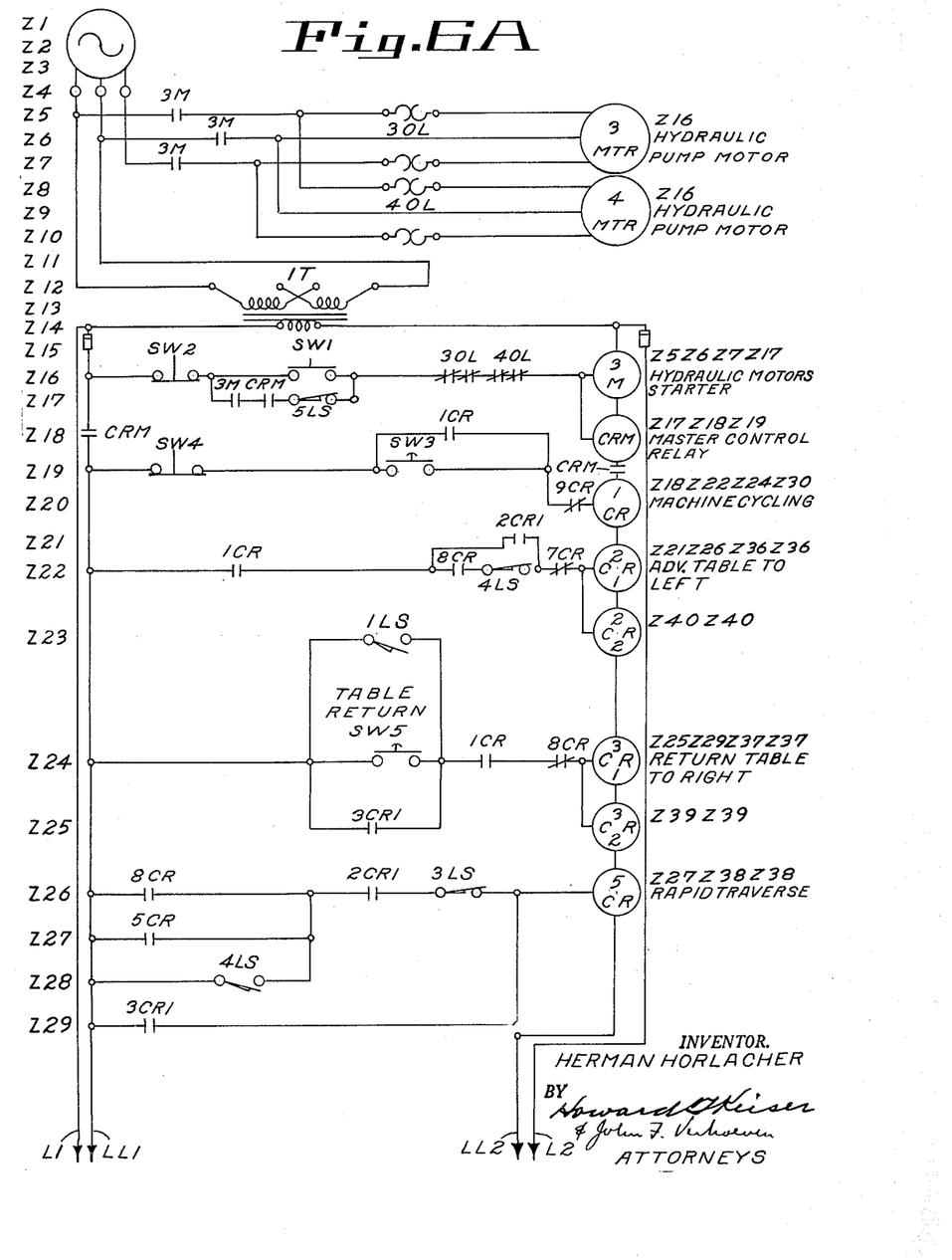
FIGS. 6A and 6B are an electrical control circuit.
Figure 6B:
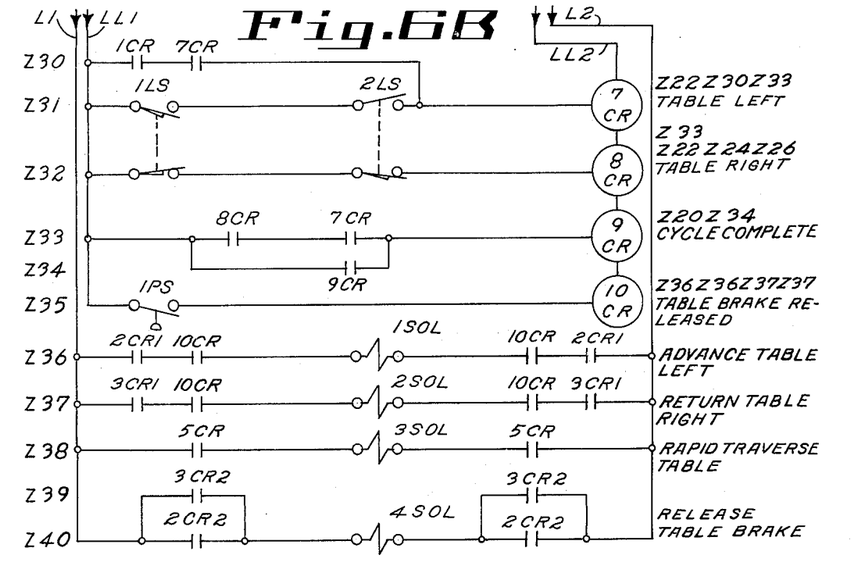

FIGS. 6A and 6B show an electrical control circuit for operation of the hydraulic circuit described. (Horizontal reference locations are prefixed with a Z and parenthesized herein). The motors 3MTR (Z6) and 4MTR (Z9) operate the pump at the source of control fluid under pressure 123 (FIG. 5) and the variable delivery pump 12, respectively. These motors are energized when the master start switch SW1 (Z16) is closed and control voltage from the transformer 1T (Z13) is applied through normally closed stop switch SW2 and contacts of the overload relays 30L and 40L to the starter relay 3M (Z16) and the master control relay CRM (Z18). Conductors LL1 and LL2 are included in the control circuit when the contacts of relay CRM at Z18 and Z19 close. In its initial position, the machine table is to the right of its path of travel. With the table in this position, limit switch 2LS is operated by the table dog 141 to close its contacts (Z32). Limit switch 1LS has contacts (Z32) which are normally closed so that relay 8CR is picked up. Now, when the cycle start switch SW3 (Z19) is closed, voltage is applied through normally closed contacts of the cycle stop switch SW4 and relay 9CR to pick up relay 1CR (Z20) which latches. When relay 1CR picks up, relays 2CR1 (Z22) and 2CR2 (Z23) pick up, voltage being applied thereto through contacts of relays 1CR and 8CR and normally closed contacts of limit switch 4LS and relay 7CR. Relay 5CR (Z26) also picks up through contacts of relays 8CR, 2CR1 and normally closed contacts of limit switch 3LS. When relay 2CR2 is up, solenoid 4SOL (Z40) is energized also and the table brake is released. Release of the brake causes pressure switch 1PS (Z35) to close and relay 10CR (Z35) picks up. When this happens, solenoid 1SOL (Z36) is energized through contacts of relays 2CR1 and 10CR. The table advances to the left as the control lever 29 (FIGS. 1, 5) is caused to swing clockwise. Since relay 5CR is up, solenoid 3SOL (Z38) is energized and the table moves in rapid traverse.

When the table begins to move left, the contacts of limit switch 2LS change as the table dog 141 moves away from the limit switch and relay 8CR (Z32) is dropped. Relay 5CR remains picked up through its own latch contacts. At a predetermined point, the table dog 138 operates limit switch 3LS and relay 5CR is caused to drop out. Solenoid 3SOL is deenergized. The cams 42 and 44 (FIG. 5) are caused to rotate counterclockwise to the feed position. The table now feeds for a predetermined amount before limit switch 4LS (Z28) is operated by the table dog 138. Relay 5CR (Z26) is again picked up since the table dog 138, which previously had operated limit switch 3LS (Z26) has moved off of that limit switch and since relay 2CR1 is still up. Again solenoid 3SOL is energized to rotate the cams 42 and 44 (FIGS. 1, 5) to the rapid traverse condition. The table moves rapidly left until limit switch LS1 is contacted and operated by the table dog 138 which causes relay 7CR (Z31) to pick up through closed contacts of limit switch 2LS and 1LS. Relay 7CR latches through contacts of relays 1CR and 7CR. When relay 7CR is up, relays 2CR1 (Z22) and 2CR2 (Z23) are dropped out.

As limit switch 1LS was operated by the table dog 138, relays 3CR1 (Z24) and 3CR2 (Z25) picked up through contacts of 1CR and normally closed contacts of relay 8CR. Solenoid 2SOL (Z37) is now energized through contacts of relays 3CR1 and 10CR and the control lever 29 (FIG. 5) is swung counterclockwise to the return feed right position. The rapid traverse condition of the cams prevails and the table returns rapidly to its initial position where limit switch 2LS is operated by the table dog 141. When this happens, relay 8CR (Z32) is picked up through contacts of limit switches 1LS which has been released by table dog 138 and 2LS. When relay 8CR is up with relay 7CR, relay 9CR is picked up. When relay 9CR picks up relay 1CR (Z20) is dropped. Relays 7CR, 3CR1, and 3CR2 drop as relay 1CR drops. Solenoid 2SOL (Z37) is deenergized and relay 5CR (Z26) is dropped when relay 3CR1 is dropped. Solenoid 3SOL (Z38) is also deenergized as relay 5CR is dropped. As relay 3CR2 is dropped, solenoid 4SOL (Z40) is deenergized and the table brake is set. The machine is now in its initial position and ready for another cycle which would again be initiated by closing the cycle start switch SW3 (Z19).

Figure 7:
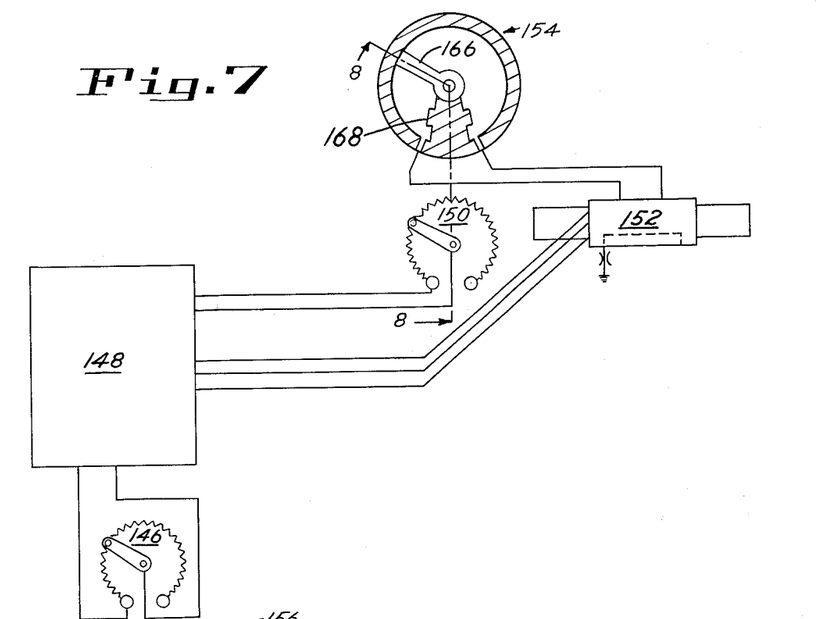
FIG. 7 is a schematic showing of a remote control mechanism including a positioning motor.

The control mechanism described is also readily adapted to remote rate control operation. FIG. 7 shows schematically a remote positioning system for adjustment of the angular positions of cams 42, 44. A servo transmitter 146 of the rheostat type is connected to an electronic unit 148 and applies a command position signal thereto. An analogue generator 150 also of the rheostat type is connected to the electronic unit and applies a signal corresponding to the actual position of the cam shaft 62 (FIG. 2) to which the generator is attached when a remote control arrangement is used. The electronic unit 148 compares the two signals and produces an error output signal when the signals do not correspond. The error signal is applied to a servo valve 152 in such a manner that the valve connects fluid under pressure to a positioning hydraulic motor 154 to cause the motor to rotate in a direction which decreases the error signal. The hydraulic motor 154 is connected to rotate the cam shaft 62 (FIG. 2) as a motor paddle rotor 166 moves. When the error signal is nulled in the electronic unit 148, the hydraulic motor 154 is static and the positions of the transmitter 146 and generator 150 are the same. In remote operation of the pump control mechanism, a similar remotely operated positioning motor is connected to the other cam shaft 60 for independent operation.

Figure 8:
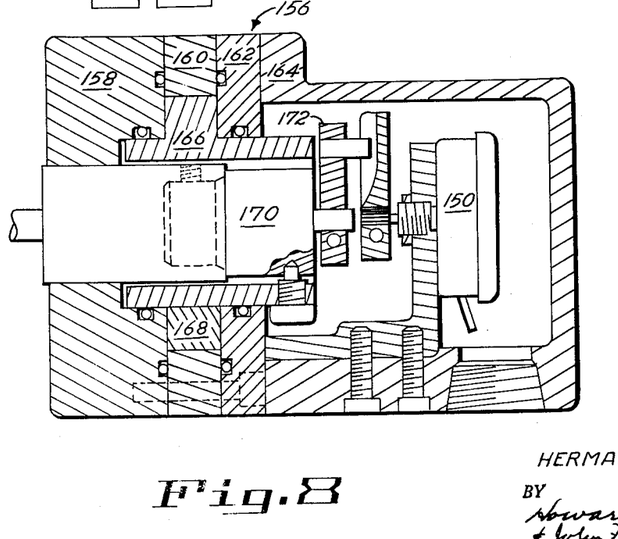
FIG. 8 is a detailed sectional view of the schematically shown positioning motor of FIG. 7 as it would appear on the line 8—8 thereof.

FIG. 8 shows a detailed sectional view of the rotary cylinder motor 154. The cylinder housing 156, comprised of members 158, 160, 162, and 164, encloses a chamber in which the rotatable paddle 166 is received. Selective introduction of fluid under pressure into the chamber between one side of the paddle 166 and the wall portion 168 which is fixed in the cylinder housing 156 will cause the paddle to swing within the chamber in the housing. When the paddle 166 swings, the shaft 170 rotates. The arm 172 is fixed on one end of the shaft 170 and positions the analogue generator 150 which sends a position signal to the electronic comparator unit 148. The other end of the shaft 170 is fixed to the cam shaft 62 (FIG. 2) and causes it to rotate as the paddle 166 is caused to swing. In remote control operation, the rack member 80 (FIG. 3) is free to move axially so as not to interfere with the remote operation or may be removed entirely. The cam shaft 60 is also connected to a rotary cylinder motor and is angularly positioned in the same manner. Rack 78 is also free to move axially so as not to interfere, or may also be removed entirely.

What is claimed is:

1. In a machine tool having a rotary fluid motor connected to a slide for movement thereof, a reversible variable displacement pump to operate said motor, and a source of fluid under pressure, a pump control mechanism comprising in combination, a housing, a control lever received in said housing and pivotally movable from a neutral position therein, a control bar connected between said control lever and said pump for producing a displacement therein proportional to the distance and direction of movement of said control lever from the neutral position, a pair of cams rotatably received in said housing on opposite sides of said control lever, each cam of said pair of cams having a surface spaced from said control lever in the neutral position in accordance with the angular position of said cam, a pair of plungers slidably received in said housing and adapted to engage said control lever, said pair of plungers operable to pivot said control lever from the neutral position to engage one of said cams when one only of said plungers is connected to said source of fluid under pressure, selectively operable means to connect said plungers to said source of fluid under pressure one at a time, and selectively operable means to rotate said cams and adjust the angular position thereof.

2. In a machine tool having a rotary fluid motor connected to a slide for movement thereof, a reversible variable displacement pump to operate said motor, and a source of fluid under pressure, a pump control mechanism comprising in combination, a housing, a control lever received in said housing and pivotally movable from a neutral position therein, a control bar connected between said control lever and said pump for producing a displacement therein proportional to the distance and direction of movement of said control lever from the neutral position, a pair of cams rotatably received in said housing on opposite sides of said control lever, each cam of said pair of cams having a spiral surface spaced from said control lever in the neutral position in accordance with the angular position of each cam of said pair of cams, a pair of plungers slidably received in said housing and adapted to engage said control lever, said plungers operable to pivot said control lever from the neutral position to engage one of said cams when one only of said plungers is connected to said source of fluid under pressure, selectively operable means to connect said plungers to said source of fluid under pressure one at a time, a pair of reversibly operable fluid motors, each motor of said pair of motors connected to one of said cams, and means to selectively connect said pair of fluid motors to said source of fluid under pressure to rotate said cams to adjust the angular position thereof.

3. In a machine tool having a rotary fluid motor connected to a slide for movement thereof, a reversible variable displacement pump to control said rotary fluid motor, and a source of fluid under pressure, a pump control mechanism comprising in combination, a housing, a control lever received in said housing and pivotally movable from a neutral position therein, a control bar connected between said control lever and said pump for producing a displacement therein proportional to the distance and in accordance with the direction of movement of said control lever from the neutral position, a pair of cam shafts rotatably received in said housing on opposite sides of said control lever, a pair of cams, each cam of said pair of cams having a spiral surface, one of said cams fixed to one of said cam shafts and the other of said cams fixed to the other of said cam shafts, each of said spiral surfaces spaced from said control lever in the neutral position in accordance with the angular position of the respective cam shaft, a pair of plungers slidably received in said housing and adapted to engage said control lever, said plungers operable to pivot said control lever from the neutral position to engage one of said cams when one only of said plungers is connected to said source of fluid under pressure, selectively operable means to connect said plungers to said source of fluid under pressure one at a time, a pair of pinions, one of said pinions fixed to one of said cam shafts, the other of said pinions fixed to the other of said cam shafts, a pair of racks slidably received in said housing, one of said racks engaged with one of said pinions, the other of said racks engaged with the other of said pinions, and means to selectively move each of said racks between alternate positions to rotate said pinions to effect angular adjustment of the respective cam shafts between alternate positions corresponding to the alternate positions of said racks.

4. In a machine tool having a rotary fluid motor connected to a slide for movement thereof, a reversible variable displacement pump to control said rotary fluid motor, and a source of fluid under pressure, a pump control mechanism comprising in combination, a housing, a control lever received in said housing and pivotally movable from a neutral position therein, a control bar connected between said control lever and said pump for producing a displacement therein proportional to the distance and in accordance with the direction of movement of said control lever from the neutral position, a pair of cam shafts rotatably received in said housing on opposite sides of said control lever, a pair of cams, each cam of said pair of cams having a spiral surface, one of said cams fixed to one of said cam shafts, the other of said cams fixed to the other of said cam shafts, each of said spiral surfaces spaced from said control lever in the neutral position in accordance with the angular position of the respective cam shaft, a pair of plungers slidably received in said housing and adapted to engage said control lever, said plungers operable to pivot said control lever from the neutral position when one only of said plungers is connected to said source of fluid under pressure and operable to hold said control lever in the neutral position when both of said levers are connected to said source of fluid under pressure, means to selectively connect said plungers to said source of fluid under pressure, a pair of pinions, one of said pinions fixed to one of said cam shafts, the other of said pinions fixed to the other of said cam shafts, a pair of racks slidably received in said housing, one of said racks engaged with one of said pinions, the other of said racks engaged with the other of said pinions, each of said racks movable between predetermined positions, means to selectively connect the ends of said racks to said source of fluid under pressure to effect movement of said racks from one of said predetermined positions to another of said predetermined positions to adjust the angular positions of said cam shafts to positions corresponding to said predetermined positions of said racks, and means to adjust at least one of the predetermined positions of each of said racks.

5. In a machine tool having a rotary fluid motor connected to a slide for movement thereof, a reversible variable displacement pump to operate said motor, and a source of fluid under pressure, a pump control mechanism comprising in combination, a housing, a control lever received in said housing and pivotally movable from a neutral position therein, a control bar connected between said control lever and said pump for producing a displacement therein proportional to the distance and in accordance with the direction of movement of said control lever from the neutral position, a pair of cams rotatably received in said housing, each cam of said pair of cams having a spiral surface spaced from said control lever in the neutral position in accordance with the angular position of each cam of said pair of cams, a pair of plungers slidably received in said housing and adapted to engage said control lever, said plungers operable to pivot said control lever from the neutral position to engage one of said cams when one only of said plungers is connected to said source of fluid under pressure, selectively operable means to connect said plungers to said source of fluid under pressure one at a time, a pair of reversibly operable positioning motors, one of said positioning motors connected to one of said cams, the other of said positioning motors connected to the other of said cams, means to generate position command signals, and means to operate said positioning motors in response to said position command signals for selected angular adjustment of said cams.

6. In a machine tool having a rotary fluid motor connected to a slide for movement thereof, a reversible variable displacement pump to operate said motor, and a source of fluid under pressure, a pump control mechanism comprising in combination, a housing, a control lever received in said housing and pivotally movable from a neutral position therein, a control bar connected between said control lever and said pump for producing a displacement therein proportional to the distance and in accordance with the direction of movement of said control lever from the neutral position, a pair of cams rotatably received in said housing, each cam of said pair of cams having a spiral surface spaced from said control lever in the neutral position in accordance with the angular position of each cam of said pair of cams, a pair of plungers slidably received in said housing and adapted to engage said control lever, said plungers operable to pivot said control lever from the neutral position to engage one of said cams when one only of said plungers is connected to said source of fluid under pressure, selectively operable means to connect said plungers to said source of fluid under pressure one at a time, a pair of reversibly operable positioning motors, one of said positioning motors connected to one of said cams, the other of said positioning motors connected to the other of said cams, a pair of position signal generators, each of said signal generators having a signal output, a pair of analogue signal generators, one of said analogue generators connected to one of said cams, the other of said analogue generators connected to the other of said cams, each of said analogue generators having a signal output, means to compare the signal output from one of said signal generators with the signal output from one of said analogue generators for production of one error signal and to compare the signal output of the other of said signal generators with the signal output of the other of said analogue generators for producing another error signal, and a pair of servo valves, one of said servo valves responsive to said one error signal to operate one of said positioning motors in an error signal reducing direction and the other of said servo valves responsive to the other error signal to operate the other of said positioning motors in an error signal reducing direction, said positioning motors thereby adjusting the angular positions of said cams.

7. In a machine tool having a hydraulic motor connected to a slide for movement thereof and a variable displacement pump to operate said motor, a pump control mechanism comprising in combination, a control member movable from a neutral position and connected to said pump for producing a displacement therein proportional to the distance of movement of said control member from the neutral position, a stop spaced from said control member in the neutral position and adjustable relative to the neutral position, a fixed stroke hydraulic motor operatively connected to the stop to effect shifting thereof between a predetermined near position and a predetermined remote position, means to shift said control member against the stop to move the slide at a rate determined by the position of the stop, and means to shift the control member to the neutral position to stop the slide.

8. In a machine tool having a rotary fluid motor connected to a slide for movement thereof and a reversible variable displacement pump to operate said motor, a pump control mechanism comprising in combination, a control member movable from a neutral position and connected to said pump for producing a displacement therein proportional to the distance and in accordance with the direction of movement of said control member from the neutral position, a pair of stops spaced from said control member in the neutral position and on opposite sides thereof, one of said stops being adjustable relative to the neutral position of the control member, a fixed stroke hydraulic motor operatively connected to said adjustable stop to effect shifting thereof between a predetermined near position and a predetermined remote position, means to shift said control member in one direction against the adjustable stop when said stop is in the remote position to advance the slide at a rapid rate, means to operate said hydraulic motor connected to the adjustable stop in response to the position of the slide to shift the stop to its near position and reduce the speed of the slide, and means responsive to the position of the slide to shift the control member in the other direction and against the other of said stops to reverse movement of the slide.

9. In a machine tool having a rotary fluid motor connected to a slide for movement thereof and a reversible variable displacement pump to operate said motor, a pump control mechanism comprising in combination, a control lever pivotally movable from a neutral position, means to connect said control lever to said pump for producing a displacement therein proportional to the distance and in accordance with the direction of movement of said control lever from the neutral position, a pair of cams spaced from said control lever in the neutral position and on opposite sides thereof, a pair of plungers operable to pivot said control lever from the neutral position to engage one of said cams when one only of said plungers is energized, a pair of racks, each rack of said pair of racks movable between respective alternate positions and connected to one of said cams for adjustment thereof relative to the neutral position of said control lever, means to energize one of said plungers to pivot said control lever against one of said cams and effect operation of said motor for movement of said slide in one direction, means responsive to predetermined positions of said slide during movement thereof in said one direction to effect movement of one of said racks between the respective alternate positions thereof to produce displacements in said pump for operation of said motor at a fast rate and a slow rate in accordance with a predetermined cycle of operation of said motor, means responsive to movement of said slide to a predetermined position to effect deenergization of said one plunger and energization of the other of said plungers for reversal of displacement in said pump to reverse said motor, and effect movement of said slide in the other direction, means responsive to predetermined positions of said slide during movement thereof in said other direction to effect movement of the other of said racks between the respective alternate positions thereof to produce displacements in said pump for operation of said motor at a fast rate and a slow rate in accordance with a predetermined cycle of operation of said motor, and means responsive to the movement of said slide in said other direction to a predetermined position to effect energization of both of said plungers to move said control lever to the neutral position thereof.

10. In a machine tool having a rotary fluid motor connected to a slide for movement thereof, a reversible variable displacement pump to operate said motor, and a source of fluid under pressure, a pump control mechanism comprising in combination, a control lever pivotally movable in either direction from a neutral position, means to connect said control lever to said pump for producing a displacement therein proportional to the distance and in accordance with the direction of movement of said control lever from the neutral position, a pair of cams spaced from the neutral position of said control lever and on opposite sides thereof, a pair of cylinders spaced from said control lever, each of said pair of cylinders having a bushing therein slidable from a seated position therein away from said control lever, each of said bushings having a plunger received therethrough and slidable from a retracted position in said bushing toward said control lever, means to selectively and alternately connect each of said cylinders to said fluid under pressure, said fluid under pressure, when connected to one of said cylinders, operable to hold said bushing thereof in the seated position and to slide the respective plunger received therethrough toward said control lever to effect pivotal movement thereof into engagement with one of said cams, the bushing of the other cylinder forced to slide from the seated position thereof with the respective plunger therethrough held in the retracted position by the pivotal movement of said control lever, means selectively operable to connect the other of said cylinders to said source of fluid under pressure concurrent with connection of said one cylinder to said source of fluid under pressure, said other bushing thereby forced to the seated position thereof to effect pivotal movement of said control lever to the neutral position thereof, said plunger received in said one bushing thereby forced to the retracted position thereof, and means to selectively move said cams to change the distance thereof from the neutral position of said control lever.

References Cited in the file of this patent

UNITED STATES PATENTS

| | | |
|---|---|---|
| 1,854,127 | Ferris | Apr. 12, 1932 |
| 2,234,009 | Robinson | Mar. 4, 1941 |

FOREIGN PATENTS

| | | |
|---|---|---|
| 412,816 | Germany | Mar. 23, 1922 |